United States Patent
Nishida

(10) Patent No.: US 11,945,490 B2
(45) Date of Patent: Apr. 2, 2024

(54) SHOPPING CART

(71) Applicant: TOSHIBA TEC KABUSHIKI KAISHA, Tokyo (JP)

(72) Inventor: Masatoshi Nishida, Koto Tokyo (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 345 days.

(21) Appl. No.: 17/343,155

(22) Filed: Jun. 9, 2021

(65) Prior Publication Data

US 2022/0009537 A1 Jan. 13, 2022

(30) Foreign Application Priority Data

Jul. 10, 2020 (JP) .................................. 2020-119384

(51) Int. Cl.
| | |
|---|---|
| *B62B 5/04* | (2006.01) |
| *B60R 25/08* | (2006.01) |
| *B60R 25/30* | (2013.01) |
| *B62B 3/14* | (2006.01) |
| *G06F 3/14* | (2006.01) |
| *G06T 7/246* | (2017.01) |

(52) U.S. Cl.
CPC .............. *B62B 5/0423* (2013.01); *B62B 3/14* (2013.01); *G06F 3/14* (2013.01); *G06T 7/246* (2017.01); *B60R 25/08* (2013.01); *B60R 25/305* (2013.01); *B62B 3/1424* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 10,124,821 | B2 | 11/2018 | Hannah |
| 2006/0254861 | A1* | 11/2006 | Perrier .................. G07F 7/0627 186/26 |
| 2007/0045018 | A1 | 3/2007 | Carter |
| 2011/0279252 | A1* | 11/2011 | Carter ....................... B60T 7/16 340/426.11 |
| 2012/0296751 | A1* | 11/2012 | Napper ................ G06Q 20/208 705/23 |

(Continued)

FOREIGN PATENT DOCUMENTS

| | | |
|---|---|---|
| CN | 101556725 A | 10/2009 |
| CN | 106573633 A | 4/2017 |

(Continued)

*Primary Examiner* — Adam D Tissot
*Assistant Examiner* — Garrett F Evans
(74) *Attorney, Agent, or Firm* — Kim & Stewart LLP

(57) ABSTRACT

According to one embodiment a shopping cart includes an imaging unit configured to acquire images of a surface at a location of the shopping cart and a controller. The controller is configured to detect a boundary pattern in images acquired by the imaging unit. The boundary pattern is painted or drawn on the surface at a boundary between a first area and a second area. Based on the detected boundary pattern the controller determines whether the shopping cart has been moved from the first area to the second area or from the second area to the first area. The controller then controls mobility of the shopping cart based on whether the shopping cart has been moved from the first area to the second area or from the second area to the first area.

20 Claims, 8 Drawing Sheets

(56) References Cited

U.S. PATENT DOCUMENTS

| | | |
|---|---|---|
| 2015/0070170 A1 | 3/2015 | Margalit |
| 2020/0079412 A1 | 3/2020 | Ramanathan |
| 2021/0284223 A1* | 9/2021 | Carter .................... H04N 7/181 |

FOREIGN PATENT DOCUMENTS

| | | |
|---|---|---|
| CN | 110874620 A | 3/2020 |
| CN | 210555056 U | 5/2020 |
| FR | 2859809 A1 | 3/2005 |
| JP | 2007054358 A | 3/2007 |

* cited by examiner

SHOPPING CART

CROSS-REFERENCE TO RELATED APPLICATION

This application is based upon and claims the benefit of priority from Japanese Patent Application No. 2020-119384, filed Jul. 10, 2020, the entire contents of which are incorporated herein by reference.

FIELD

Embodiments described herein relate generally to a shopping cart.

BACKGROUND

In a store such as a supermarket, a customer uses a cart (hereinafter referred to as shopping cart) or the like to carry commodities that the customer purchases or intends to purchase. The shopping cart is generally for use in a specified area such as the inside of the store. However, a shopping cart is sometimes taken out of the specified area because of a reason such as theft.

In the case of a commercial facility such as a shopping mall occupied by a plurality of stores, it is also generally to be assumed that shopping carts are provided exclusively for use in a specific one of the stores or otherwise for use within the stores of the shopping mall.

There has been proposed a technique for performing communication with a wireless communication device provided in a shopping cart and detecting, based on a reception signal from the wireless communication device, an area where the shopping cart is presently located (see, for example, JP-A-2007-54358).

However, in this technique of the related, since the location of the shopping cart is detected based on the intensity of the reception signal, it is likely that the intensity of the reception signal will fluctuate according to other objects present in the area and a radio signal environment more generally. Accordingly, in the technique of the related art, it is likely that boundaries between a movement permitted area and other areas will be unclear. Thus, there is a need for improved technologies for limiting the range in which the shopping cart is movable.

DETAILED DESCRIPTION

An object of at least one embodiment is to provide a shopping cart that can more accurately limit the moveable range of a shopping cart.

According to an embodiment, a shopping cart includes an imaging unit (e.g., a camera) and a controller. The imaging unit is configured to acquire images of a surface, such as the floor or the ceiling, at a location of the shopping cart. The controller is configured to detect a limitation pattern (also may be referred to as a boundary pattern or boundary line pattern) in images acquired by the imaging unit. The limitation pattern is drawn, painted, or otherwise established on the surface at a boundary between a first area and a second area. The controller is configured to determine, based on the detected limitation pattern, whether the shopping cart has been moved from the first area to the second area or from the second area to the first area. The controller then controls the mobility of the shopping cart based on whether the shopping cart has been moved from the first area to the second area or from the second area to the first area.

A shopping cart according to one or more example embodiment is explained with reference to the drawings. In an example embodiment, it is assumed that the shopping cart is being used in a commercial facility such as a shopping mall occupied by a plurality of stores. However, the present disclosure is not limited to such an example.

Configuration of the Shopping Cart

Figure 1:
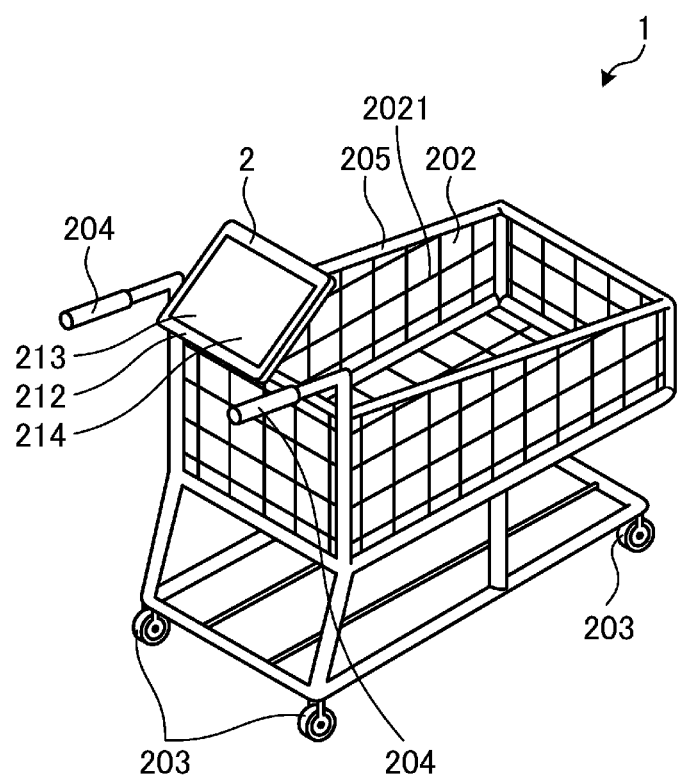
FIG. 1 is a perspective view illustrating an example of a shopping cart according to an embodiment.

First, the configuration of a shopping cart 1 according to this embodiment is explained. FIG. 1 is a perspective view of the shopping cart 1. The shopping cart 1 includes a basket-like storing section 202 opened on the upper side and caster sections 203 for movement. The caster sections 203 are disposed below the storing section 202. Handle sections 204 are coupled to the storing section 202. The handle sections 204 can be gripped by a customer as the customer moves the shopping cart 1. The caster sections 203 may be referred to as "wheels."

An overall skeleton of the shopping cart 1 is formed by a frame 205. In the storing section 202, mesh portions 2021 are stretched or otherwise disposed across parts of the frame 205 forming the storing section 202. Commodities can be stored in the storing section 202 and still be visually recognizable from the outside. Consequently, a store clerk or the like can easily see details of the commodities stored in the storing section 202.

The shopping cart 1 itself need not include the storing section 202 as an integrated basket section. For example, the shopping cart 1 may instead include a basket receiving section that receives and holds a shopping basket in which commodities can be stored. The shopping basket received by the basket receiving section may be used as the storing section 202 in some examples.

A camera 2051 (see FIG. 20 is provided on the bottom surface of the frame 205. The bottom surface of the frame 205 can be the surface to which the caster sections 203 are attached. The position where the camera 2051 is provided is not limited to the bottom surface of the frame 205. The camera 2051 may be provided in, for example, a portion of the frame 205 that holds one of the caster sections 203.

The camera 2051 is an imaging device including an image sensor such as a CCD (Charge Coupled Device) or a CMOS (Complementary MOS). The camera 2051 is an example of the "imaging unit".

The camera 2051 images the floor surface under the position where the shopping cart 1 is present. A line formed by solid lines of two colors can be drawn or painted on the floor surface of the commercial facility at particular positions or boundaries. The camera 2051 acquires images of the line on the floor surface of the commercial facility when the shopping cart 1 is above a portion of the line. The line in this context is an example of a linear limitation pattern or a boundary pattern.

The camera 2051 is not limited to just imaging the floor surface at the position where the shopping cart 1 is present. For example, the camera 2051 may be provided at a position where the camera 2051 can image a ceiling above the position where the shopping cart 1 is present to acquire images of a linear limitation pattern drawn on the ceiling of the commercial facility. In some examples, an optical sensor may be attached to the shopping cart 1 instead of the camera 2051 and used to detect a linear limitation pattern.

A cart terminal 2 is attached, via a holding section, to a part on the handle sections 204 side of the frame 205. The cart terminal 2 is a control device that controls the operations of the shopping cart 1.

The cart terminal 2 includes a housing 212. In the housing 212, an LCD (Liquid Crystal Display) 213 that displays information and a touch panel 214 attached to a display surface of the LCD 213 is incorporated. The touch panel 214 can be utilized to perform various kinds of input operations.

A solenoid for locking (solenoid 2031) (see FIG. 2) is provided in at least one of the caster sections 203. Solenoids 2031 may be provided in each of the caster sections.

Hardware Configuration of the Cart Terminal

Figure 2:
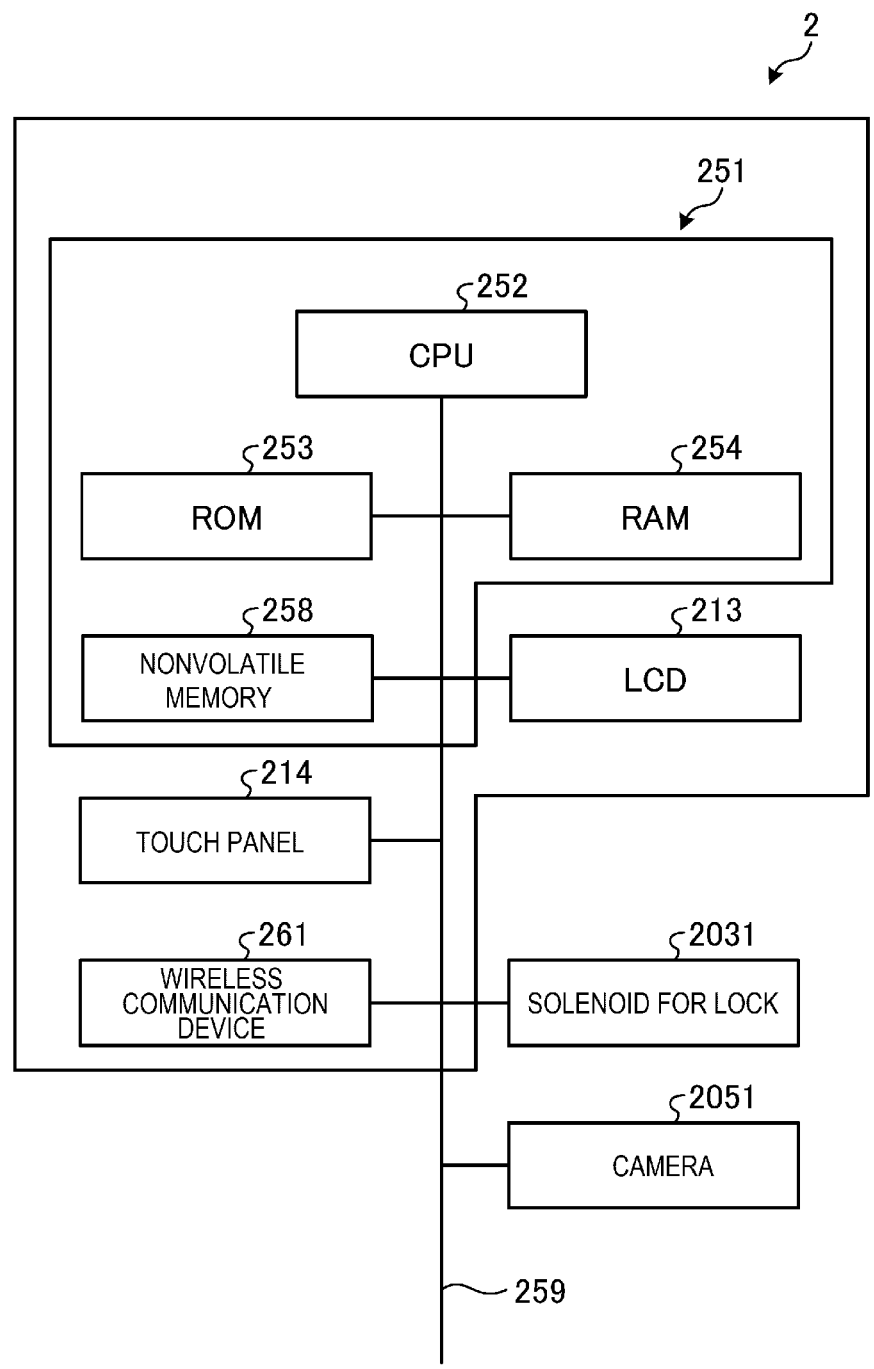
FIG. 2 is a block diagram illustrating aspects of a hardware configuration of a cart terminal according to an embodiment.

FIG. 2 is a block diagram illustrating an example of a hardware configuration of the cart terminal 2. The cart terminal 2 includes a controller 251 that controls the operations of the shopping cart 1.

The controller 251 includes a CPU (Central Processing Unit) 252, a ROM (Read Only Memory) 253, a RAM (Random Access Memory) 254, and a nonvolatile memory 258. The CPU 252 and the other components are connected via a bus line 259.

The CPU 252 executes one or more programs to control the shopping cart 1. The ROM 253 stores programs executable by the CPU 252, setting information, and the like. The RAM 254 functions as, for example, a work area of the CPU 252. For example, RAM 254 temporarily stores an image captured by the camera 2051.

The nonvolatile memory 258 stores programs to be executed by the CPU 252. The nonvolatile memory 258 may also store information such as pattern information 2581 as further explained below. The LCD 213, the touch panel 214, a wireless communication device 261, the solenoid(s) 2031, and the camera 2051 are connected to the controller 251 via the bus line 259.

The wireless communication device 261 permits, via a network, communication with a POS terminal for performing settlement, a server, a host apparatus that manages various kinds of information, or the like.

The solenoid 2031 locks a caster section 203 of the shopping cart 1 under the control of the CPU 252. The solenoids 2031 may be capable of not only simply locking the caster sections 203 but may also be capable of partially locking the caster sections 203 in a stepwise manner, that is, the solenoids 2031 may function to increase a braking force gradually or in increments such that caster sections 203 may still roll (though requiring additional effort by the cart user than in the fully unlocked state) when only a partial braking force is being applied.

Functional Configuration of the Control Unit of the Cart Terminal

Figure 3:
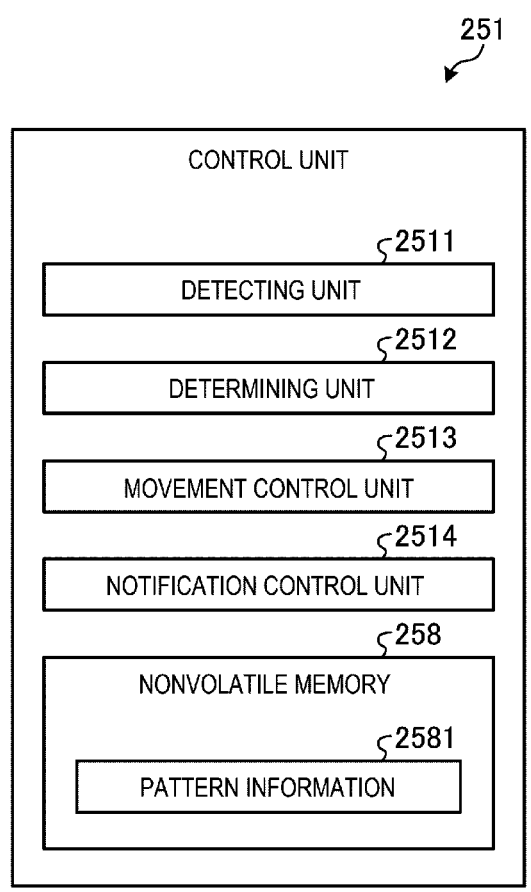
FIG. 3 is a block diagram illustrating aspects of a controller or the like of a cart terminal.

FIG. 3 is a block diagram illustrating an example of a functional aspects of the controller of the cart terminal 2. The controller 251 includes the functions of a detecting unit 2511, a determining unit 2512, a movement control unit 2513, and a notification control unit 2514. The nonvolatile memory 258 stores pattern information 2581.

The pattern information 2581 is information concerning the limitation pattern(s). In this context, a limitation pattern refers to a line or a pattern of lines (linear pattern) drawn in a boundary region between a first area (where movement of the shopping cart 1 is permitted) and a second area (where the movement of the shopping cart 1 is limited or not permitted).

In this embodiment, the limitation pattern is two lines formed by solid lines of two different colors with a specific positioning with respect to the first and second areas. The limitation pattern is not limited to this. For example, the limitation pattern may be one line formed by just one solid line of one color or may include three or more lines formed by solid lines each of a different color. One or more lines in the limitation pattern may be differentiated by a line type (for example, a broken line) other than the solid line.

In this example embodiment, two solid lines of two different colors are used and the pattern information 2581 is stored in the nonvolatile memory 258. However, the pattern information 2581 may be stored in a server or the like connected to the cart terminal 2 by a communication network.

The detecting unit 2511 detects, based on an imaging result from the camera 2051, the linear limitation pattern drawn at the boundary between the first area and the second area.

In this example embodiment, the detecting unit 2511 detects the limitation pattern from an image captured by the camera 2051 based on the pattern information 2581 stored in the nonvolatile memory 258.

For example, it is assumed that a red solid line and a black solid line are registered in the pattern information 2581 as the limitation pattern. In this case, the detecting unit 2511 detects whether the red solid line and/or the black solid line are in an image captured by the camera 2051.

The determining unit 2512 determines whether the shopping cart 1 has moved from the first area to the second area or moved from the second area to the first area based on a detection(s) of the limitation pattern by the detecting unit 2511.

Specifically, the determining unit 2512 determines in this example, whether the shopping cart 1 moved from the first area to the second area or moved from the second area to the first area based on detection order of the lines of the limitation pattern as detected by the detecting unit 2511.

For example, it is assumed that the nonvolatile memory 258 stores setting information associating a detection order of the red solid line before the black solid line (red solid line→black solid line) with movement from the first area to the second area and setting information associating a detection order of the black solid line before the red solid line (black solid line→red solid line) with movement from the second area to the first area.

Thus, if the detecting unit 2511 detects the red solid line then detects the black solid line, the determining unit 2512 recognizes red solid line→the black solid line as the detection order. The determining unit 2512 refers to the setting information stored in the nonvolatile memory 258 and thus determines that the shopping cart 1 moved from the first area to the second area based on the red solid line being detected before the black solid line.

On the other hand, if the detecting unit 2511 detects the black solid line and then the red solid line, the determining unit 2512 recognizes the black solid line→the red solid line as the detection order. When determining unit 2512 refers to the setting information stored in the nonvolatile memory 258, it will be determined that the shopping cart 1 moved from the second area to the first area.

It is assumed that the setting information stored in the nonvolatile memory 258 is set in association with a particular environment (that is, with a known state of the boundary line(s) or the like) of an actual commercial facility or the like. The nonvolatile memory 258 may store another kind of information as the setting information. A storage place for the setting information is not limited to the nonvolatile memory 258. The setting information may be stored in, for example, a storage unit of a server capable of communicating with the shopping cart 1.

As another method, if the detecting unit 2511 detects the limitation pattern, the determining unit 2512 may arrange images in which the limitation pattern is detected in a time-series order and analyze the images to identify the order in which the lines forming the limitation pattern appear in the time-series images.

In this example, the two lines are used. However, one line may be used in some examples (that is, the line drawn at the boundary between the first area and the second area may be only one solid line of one color).

However, in this case of using one solid line, a gyro sensor or the like that detects the travel direction of the shopping cart 1 along a floor would be separately used to enable the determining unit 2512 to determine whether the shopping cart 1 moved from the first area to the second area or moved from the second area to the first area.

The movement control unit 2513 controls the movement of the shopping cart 1 according to the determination results of the determining unit 2512.

For example, when the determining unit 2512 determines that the shopping cart 1 moved from the first area to the second area, once a predetermined time elapses after the determination that the shopping cart 1 moved from the first area to the second area, the movement control unit 2513 controls the solenoids 2031 to perform control for locking the caster sections 203 of the shopping cart 1 in a stepwise or gradual manner. In this context, locking the caster sections 203 in a stepwise/gradual manner as well as fully locking the caster sections 203 are both referred to as lock control.

Specifically, if the shopping cart 1 moves from the first area to the second area, the movement control unit 2513 initially increases a load (a braking force) applied to the caster sections 203 of the shopping cart 1 and, then subsequently performs a full locking of the caster sections 203.

Figure 4:
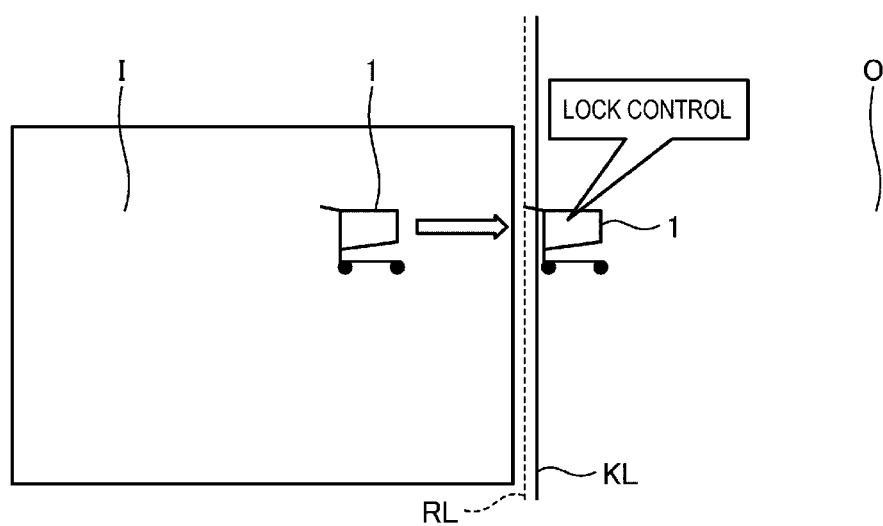
FIG. 4 is a diagram related to lock control for a shopping cart.

FIG. 4 is a diagram illustrating an example of the lock control for the shopping cart 1. The line RL is illustrated as a broken line in FIG. 4, however, in this example the broken line RL represents an actual red solid line forming the limitation pattern with the line KL (which is illustrated as a solid line illustrated in FIG. 4) which represents an actual black solid line. In FIG. 4, a region I indicates a region corresponding to a certain store of the commercial facility and a region O indicates a region (for example, a passage or hallway) outside the certain store. In this context, the region I corresponds to a "first area" and the region O corresponds to a "second area."

The nonvolatile memory 258 stores, as the setting information associating a detection order of line RL→line KL with movement from the first area to the second area and a detection order of line KL→line RL with movement from the second area to the first area.

Thus, when a user moves the shopping cart 1 from the region I to the region O outside the store region, the camera 2051 images the line RL and then the line KL. The detecting unit 2511 then detects the line RL and the line KL as the limitation pattern.

The determining unit 2512 recognizes the detection order of the limitation pattern line RL→line KL. The determining unit 2512 refers to the setting information stored in the nonvolatile memory 258 and thus determines that the shopping cart 1 moved from the first area to the second area based on the detection order of the limitation pattern.

In this example, once a predetermined time elapses after the determining unit 2512 determines that the shopping cart 1 moved from the first area to the second area, the movement control unit 2513 controls the solenoids 2031 to perform the lock control for stepwise locking of the caster sections 203.

The predetermined time used in this context can be arbitrarily set. For example, the predetermined time is set such that the movement control unit 2513 performs control for increasing a load (a braking force) applied to the caster sections 203 over five seconds from when the determining unit 2512 determines that the shopping cart 1 has moved from the first area to the second area.

If the shopping cart 1 does not return to the first area after a predetermined period elapses after the processing for increasing the load applied to the caster sections 203 has been performed, the movement control unit 2513 performs the lock control for fully locking the caster sections 203. The predetermined period can also be freely set.

For example, if the shopping cart 1 does not return to the first area after sixteen seconds elapses after the processing for increasing the load applied to the caster sections 203 was started, the movement control unit 2513 performs control to fully lock the caster sections 203 of the shopping cart 1.

In this example, the movement control unit 2513 is configured to perform the control for gradually increasing the load applied to the caster sections 203 and, thereafter, lock the caster sections 203 if the shopping cart 1 does not return to the first area within the predetermined period. However, in other examples, the movement control unit 2513 may be configured to lock the caster sections 203 without delay whenever the determining unit 2512 determines that the shopping cart 1 moved from the first area to the second area.

The movement control unit 2513 may also be configured to not begin the processing for gradually increasing the load applied to the caster sections 203 and lock the caster sections 203 unless a predetermined time elapses after the determining unit 2512 determines that the shopping cart 1 moved from the first area to the second area.

The movement control unit 2513 may also or instead be configured to perform the lock control for the caster sections 203 after the shopping cart 1 moves a predetermined distance in the second area direction after the determining unit 2512 determines that the shopping cart 1 moved from the first area to the second area.

It is preferable that the shopping cart 1 be movable in the first area direction even if the caster sections 203 are locked.

Specifically, in order to encourage the return to the first area, the lock of the caster sections 203 may prevent further movement in a traveling direction toward the second area but allow movement in the opposite direction (the direction back toward the first area. Consequently, even if the caster sections 203 are locked in this manner, the user can still move the shopping cart 1 to the first area side.

If the determining unit 2512 determines that the shopping cart 1 has moved from the second area to the first area, the movement control unit 2513 unlocks the caster sections 203 and enables the caster sections 203 to freely move.

Figure 5:
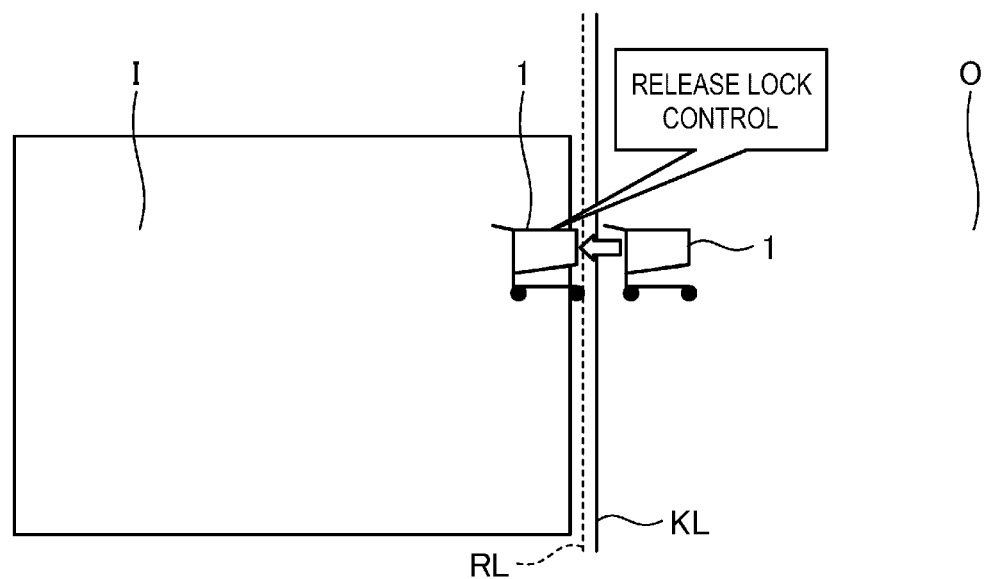
FIG. 5 is a diagram related to release of a lock control for a shopping cart.

FIG. 5 is a diagram illustrating an example of release of the lock control for the shopping cart. FIG. 5 illustrates the shopping cart 1 being moved from the region I to the region O (see FIG. 4) after having been moved from the region O to the region I.

At this time, the camera 2051 images the line KL and then the line RL. Therefore, the detecting unit 2511 detects the line KL and, thereafter, detects the line RL.

Therefore, the determining unit 2512 recognizes the detection order for the limitation pattern as line KL→line RL. The determining unit 2512 refers to the setting information stored in the nonvolatile memory 258 and thus determines that the shopping cart 1 moved from the second area to the first area.

The movement control unit 2513 therefore controls the solenoids 2031 to release the lock control of the caster sections 203. The time after return to the first area is detected and release of the lock control can be freely set.

Release of the lock control for the caster sections 203 can be limited to cases in which the determining unit 2512 determines that the shopping cart 1 moved from the second area to the first area within some predetermined time after the determining unit 2512 previously determined that the shopping cart 1 moved from the first area to the second area. For example, the predetermined time in this context may be twenty seconds.

Different information can be registered in the pattern information 2581 for each shopping cart 1. Consequently, a different movable range can be set for each shopping cart 1. An example in which different information is registered for each shopping cart 1 is explained with reference to FIGS. 6 and 7.

Figure 6:
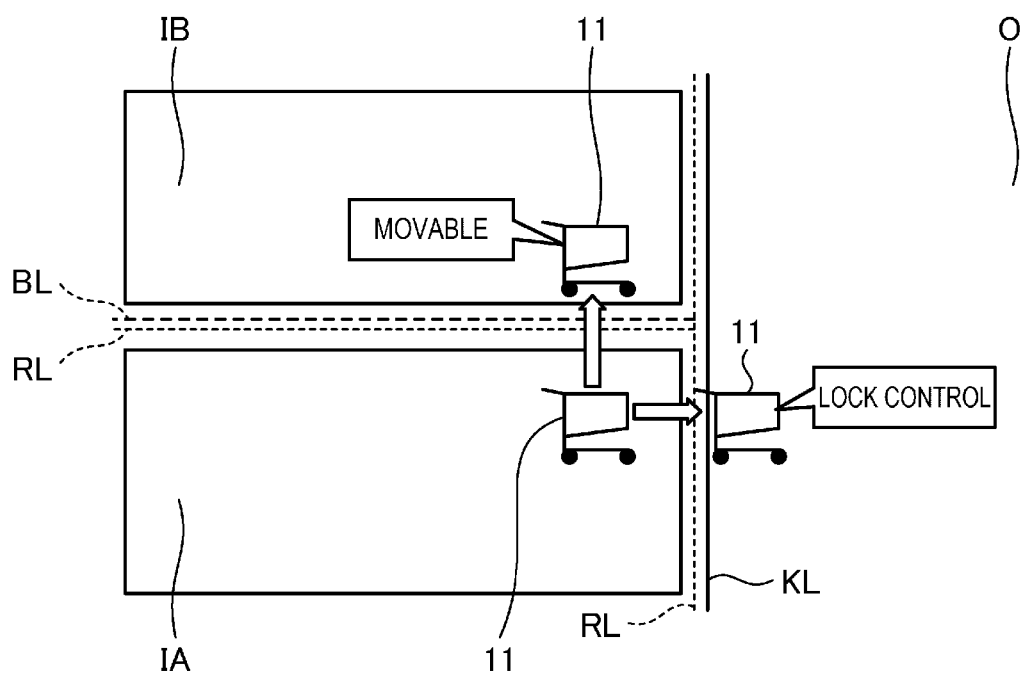
FIG. 6 is an explanatory diagram related to aspects of setting of a different movable range for shopping carts.
Figure 7:
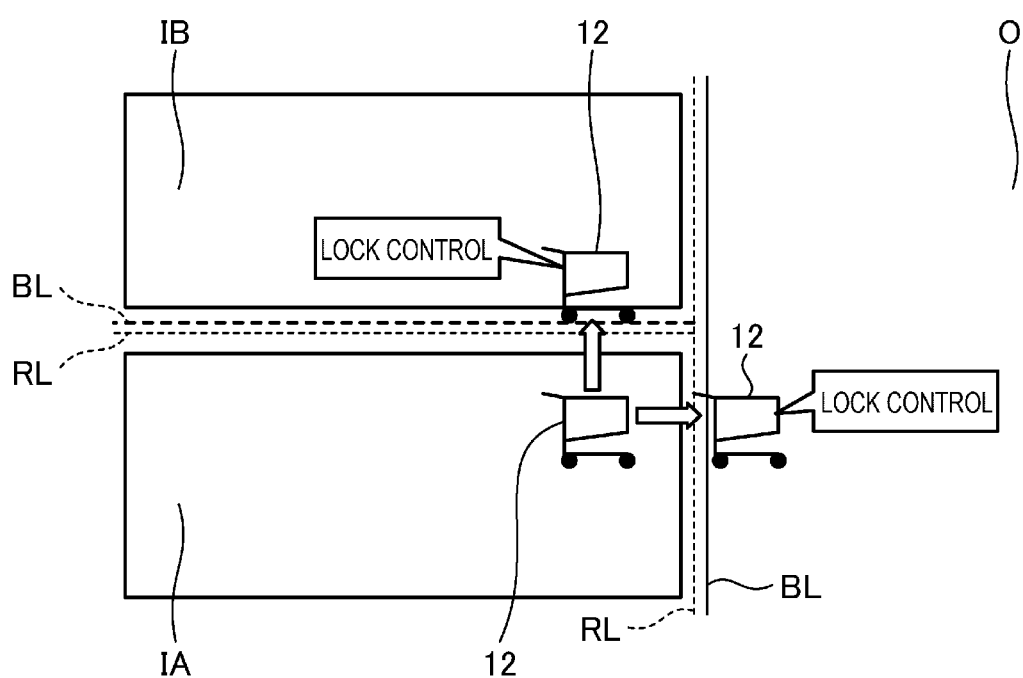
FIG. 7 is an explanatory diagram related to setting a different movable range for shopping carts.

As illustrated in FIGS. 6 and 7, a shopping cart 11 can be set to be capable of moving in a region IA of a store A and also a region IB of a store B but incapable of moving in the region O outside the store regions. A shopping cart 12 can be set to be capable of moving in the region IA of the store A but incapable of moving in the region IB of the store B and also the region O outside the store regions.

FIG. 6 is an explanatory diagram illustrating an example in which a different movable range is set for different shopping carts. In the figures, the line BL (represented in the figures as a broken line) represents a blue solid line. The lines RL and KL are the same as described in conjunction with FIG. 4.

The line BL and the line RL are drawn at a boundary between the region IA and the region IB. The line RL and the line KL are drawn at a boundary between the region IA and the region O and also at a boundary between the region IB and the region O. In the context of FIG. 6, the region IA and the region IB together correspond to the "first area" and the region O corresponds to the "second area".

Only the line RL and the line KL are registered as a limitation pattern in the pattern information 2581 for the shopping cart 11. The nonvolatile memory 258 for shopping cart 11 stores setting information associating the detection order of line RL→line KL with movement from the first area to the second area.

When the user moves the shopping cart 11 from the region IA to the region O outside the store region, the camera 2051 images the line RL and then the line KL. Therefore, the detecting unit 2511 detects the line RL then detects the line KL.

Therefore, the determining unit 2512 of shopping cart 11 recognizes the detection order of the limitation pattern as line RL→line KL. The determining unit 2512 refers to the setting information stored in the nonvolatile memory 258 and thus determines that the shopping cart 1 moved from the first area to the second area. The movement control unit 2513 performs the lock control for the caster sections 203 of the shopping cart 11 according to a determination result.

On the other hand, if the user moves the shopping cart 11 from the region IA to the region IB, the detecting unit 2511 does not detect the line BL as part of a limitation pattern. Therefore, the determining unit 2512 does not determine that the shopping cart 11 moved into a second area. That is, the shopping cart 11 is permitted to move into the region IB of the store B.

FIG. 7 is an explanatory diagram illustrating an example in which a different movable range is set for different shopping carts. In the pattern information 2581 for the shopping cart 12, the line BL and the line RL are together registered as a limitation pattern and the line RL and the line KL are also registered together as a limitation pattern.

The nonvolatile memory 258 of the shopping cart 12 stores setting information associating the detection order of line RL→line KL with movement from the first area (permitted area) to the second area (non-permitted areas) and the detection order of line RL→line BL with the movement from the first area to the second area. In the context of FIG. 7, the region IA corresponds to the "first area," and the region IB and region O together correspond to the "second area."

When user moves the shopping cart 12 from the region IA to the region IB, the camera 2051 images the line RL and then the line BL. Therefore, the detecting unit 2511 detects the line RL then the line BL.

Therefore, the determining unit 2512 recognizes the detection order line RL→line BL as the limitation pattern. The determining unit 2512 refers to the setting information stored in the nonvolatile memory 258 for the shopping cart 12 and determines that the shopping cart 12 moved from the first area to the second area. The movement control unit 2513 performs the lock control for the caster sections 203 of the shopping cart 12 according to the determination result.

If the user moves the shopping cart 12 from the region IA to the region O, setting of a movable range is the same as the setting of the movable range illustrated in FIG. 6 for shopping cart 11.

By changing the information registered in the pattern information 2581 for each shopping cart 1 in this way, different movable ranges can be set for the shopping cart 11 and the shopping cart 12.

Referring back to FIG. 3, if the determining unit 2512 determines that the shopping cart 1 moved from the first area to the second area, the notification control unit 2514 performs a notification for urging the user to return the shopping cart 1 to the first area.

In this embodiment, before the movement control unit 2513 controls the movement of the shopping cart 1, the notification control unit 2514 performs control for causing the LCD 213 to display a warning for urging the user to return the shopping cart 1 to the first area. The method of performing the notification is not limited to the display of information on the LCD 213 and may be, for example, causing a speaker to emit warning sound.

The notification performed by the notification control unit 2514 is not limited to this. For example, if the user moves the shopping cart 1 to another store (or area) before performing settlement of commodities in the prior store (or area), the notification control unit 2514 may perform, for example, a notification for urging the user to return to the prior store (or area) after finishing the settlement of commodities in the current store (or area).

Processing of the Controller

Figure 8:
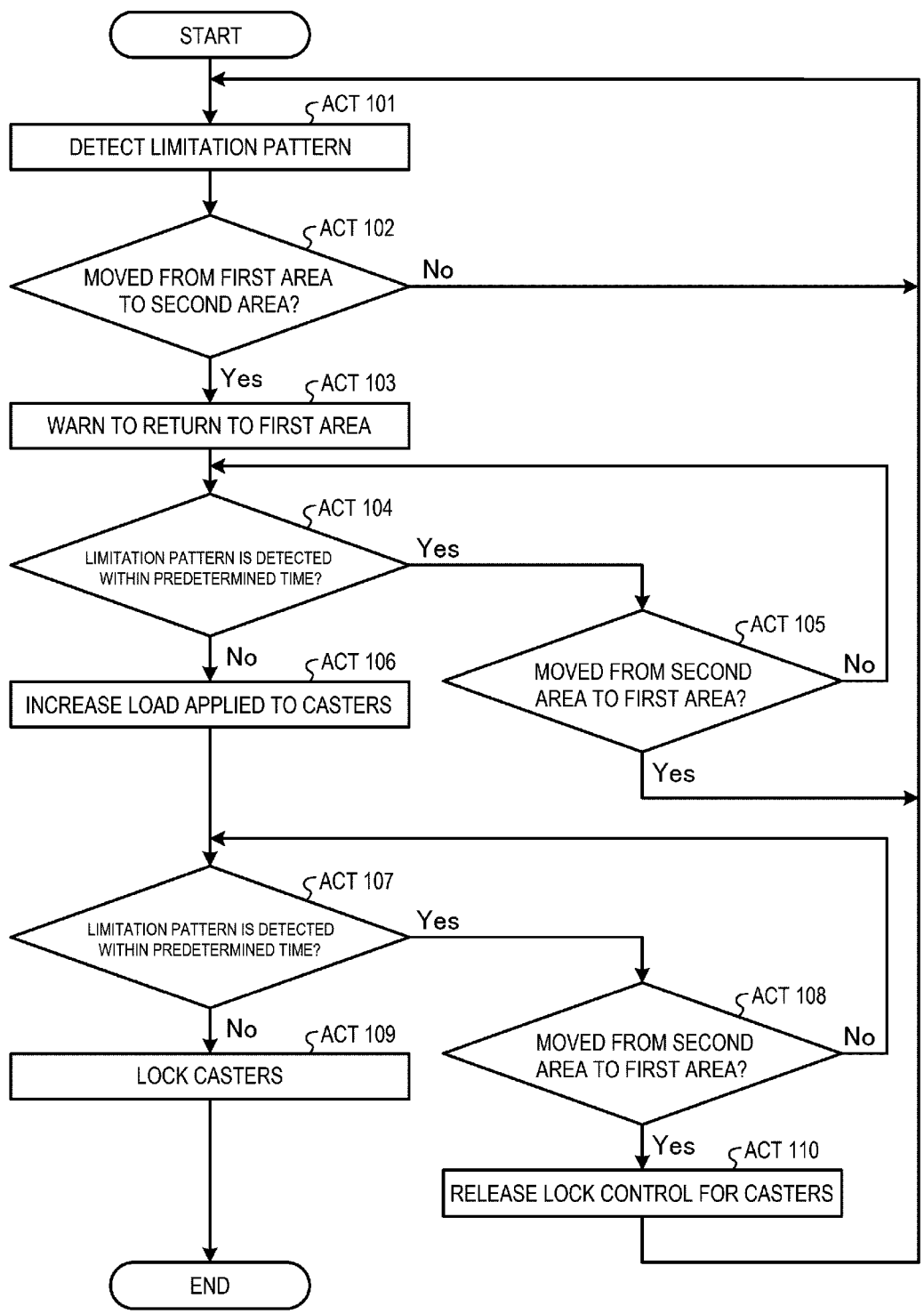
FIG. 8 is a flowchart related to aspects of lock control by a controller of a cart terminal.

Subsequently, processing of the controller 251 of the cart terminal 2 is explained. FIG. 8 is a flowchart illustrating an example of processing for locking casters stepwise performed by a controller of the shopping cart 1. For example, the controller is the controller 251 of the cart terminal 2.

First, the detecting unit 2511 detects the limitation pattern from an image captured by the camera 2051 (ACT 101). The detection of the limitation pattern in an image is based on a comparison of the pattern information 2581 in this example. The determining unit 2512 determines, based on a detection order of lines in the limitation pattern, whether the shopping cart 1 has moved from the first area to the second area (ACT 102).

If the determining unit 2512 determines that the shopping cart 1 moved from the first area to the second area (Yes in ACT 102), the notification control unit 2514 performs control for causing the LCD 213 to display a warning for urging the user to return the shopping cart 1 to the first area (ACT 103).

The detecting unit 2511 next attempts to detect the limitation pattern until some predetermined time period elapses after the determining unit 2512 first determines that the shopping cart 1 moved from the first area to the second area (ACT 104). If the detecting unit 2511 again detects the limitation pattern within the predetermined time period (Yes in ACT 104), the determining unit 2512 then determines, based on the detection order of the lines, whether the shopping cart 1 moved from the second area to the first area (ACT 105).

If the determining unit 2512 does not determine that the shopping cart 1 moved from the second area to the first area (No in ACT 105), the controller 251 returns to ACT 104. If the detecting unit 2511 does not detect the limitation pattern in ACT 104 within the predetermined time period (No in ACT 104), the movement control unit 2513 performs control for stepwise/gradual increasing of a load applied to the caster unit 203 (ACT 106).

In ACT 107, the detecting unit 2511 attempts to detect the limitation pattern until a predetermined time elapses after the movement control unit 2513 begins the control for increasing the load applied to the caster unit 203. If the detecting unit 2511 detects the limitation pattern within the relevant predetermined time (Yes in ACT 107), the determining unit 2512 then determines, based on the detection order of the lines, whether the shopping cart 1 moved from the second area to the first area (ACT 108).

If the determining unit 2512 does not determine that the shopping cart 1 moved from the second area to the first area (No in ACT 108), the controller 251 returns to ACT 107 and continues the processing until the relevant predetermined time elapses. If the detecting unit 2511 does not detect the limitation pattern within the relevant predetermined time in ACT 107 (No in ACT 107), the movement control unit 2513 locks the caster sections 203 (ACT 109) and the processing ends.

If in ACT 102 the determining unit 2512 does not determine that the shopping cart 1 moved from the first area to the second area (No in ACT 102), the controller 251 returns to ACT 101. The same processing can be performed if the determining unit 2512 determines in ACT 105 that the shopping cart 1 moved from the second area to the first area (Yes in ACT 105).

If the determining unit 2512 determines in ACT 106 that the shopping cart 1 moved from the second area to the first area (Yes in ACT 108), the movement control unit 2513 releases the lock control for the caster sections 203 (ACT 110). Thereafter, the controller 251 returns to ACT 101.

Effects of the Shopping Cart

Subsequently, certain effects of the shopping cart 1 according to this embodiment are explained. The cart terminal 2 (attached to the shopping cart 1) includes the detecting unit 2511 that detects the linear limitation pattern drawn at the boundary between the first area (where the movement of the shopping cart 1 is permitted) and the second area (where the movement of the shopping cart 1 is limited) among the areas where the shopping cart 1 can be moved. The determining unit 2512 determines, based on a detection result of the limitation pattern by the detecting unit 2511, whether the shopping cart 1 moved from the first area to the second area or from the second area to the first area. The movement control unit 2513 controls the movement of the shopping cart 1 according to a determination result of the determining unit 2512.

In this embodiment, the limitation pattern comprises a line drawn, painted, or otherwise established at the boundary between the first area and the second area. Accordingly, the first area and the second area are clearly distinguished by a line. Therefore, by controlling the movement of the shopping cart 1 based on reference to a physically drawn, painted, or otherwise established line, the movement control unit 2513 can very accurately limit the moving range of the shopping cart 1.

There is known a method using a wireless communication device provided in a shopping cart for detecting a position of the shopping cart based on a reception signal from the wireless communication device. When the first area and the second area are to be distinguished by this method, the intensity of the reception signal will sometimes fluctuate according to the positions of objects around the shopping cart, the radio signal environment, and the like. It is thus likely that the effective boundary between the first area and the second area will be uncertain, unclear, and/or somewhat variable.

In contrast, in this embodiment, the detecting unit 2511 detects, a line drawn at the boundary between the first area and the second area. The movement control unit 2513 controls the movement of the shopping cart 1 based on a result of the detection. Therefore, it is possible to more accurately limit a moving range of the shopping cart 1.

The shopping cart 1 according to this embodiment utilizes just a cart terminal 2 attached to the shopping cart 1 to perform such processing for controlling the movement of the shopping cart 1. That is, the shopping cart 1 according to this embodiment can perform the movement control processing for the shopping cart 1 without relying on a network environment, a network connection, or the like.

If the determining unit 2512 determines that the shopping cart 1 moved from the first area to the second area, the movement control unit 2513 locks the caster sections 203 of the shopping cart 1 stepwise. If the determining unit 2512 determines that the shopping cart 1 moved from the second area to the first area, the movement control unit 2513 unlocks the caster sections 203.

With the shopping cart 1 according to this embodiment, even if the user moves the shopping cart 1 from the first area to the second area by mistake, it is possible to prevent a situation in which the shopping cart 1 is immediately locked and cannot be moved.

The shopping cart 1 according to this embodiment includes the notification control unit 2514 that performs control for causing the LCD 213 to display a warning for urging the user to return the shopping cart 1 to the first area if the shopping cart 1 has been moved from the first area to the second area.

Consequently, if the user moves the shopping cart 1 from the first area to the second area by mistake, the shopping cart 1 according to this embodiment can urge the user to return to the first area.

Modifications

Modification 1

In an example embodiment explained above, the shopping cart 1 alone performs the processing for controlling the movement of the shopping cart 1. However, in another example, a server capable of communicating with a plurality of shopping carts 1 may be provided to perform, on the server side, the processing for controlling the movement of the shopping cart 1. For example, the shopping cart 1 may perform only processing for transmitting an image captured by the camera 2051 to the server. The server may then perform the other processing and transmit results and/or instructions through the communication network.

In this case, the shopping cart 1 only transmits the images to the server. Therefore, design specifications (e.g., the processing performance of the CPU 252, the storage capacity of the nonvolatile memory 258, and the like) of the cart terminal 2 can be reduced. It is possible, on the server side, to identify states of a plurality of shopping carts 1 (a movable state, a state in which a load is applied to casters, a locked state, and the like). Consequently, it is possible to more comprehensively manage the plurality of shopping carts 1.

Modification 2

In an example embodiment explained above, if the determining unit 2512 determines that the shopping cart 1 moved from the second area to the first area, the caster sections 203 are unlocked. However, the method of unlocking the caster sections 203 is not limited to this example embodiment.

For example, a linear release pattern for instructing unlock may be provided in a manner similar to the limitation pattern. Information concerning the release pattern may be registered in the pattern information 2581. In this case, when the detecting unit 2511 detects the release pattern, the movement control unit 2513 releases the lock control for the caster sections 203.

Figure 9:
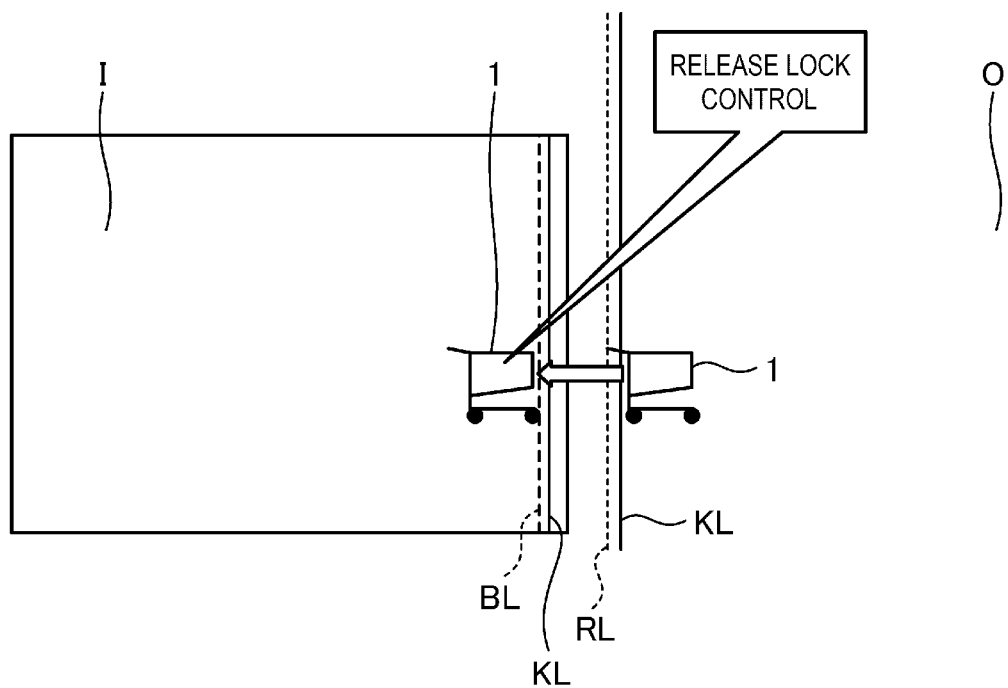
FIG. 9 is an explanatory diagram related to release of lock control for a shopping cart according to a modification.

FIG. 9 is an explanatory diagram illustrating an example of processing related to releasing lock control for casters of a shopping cart according to a modification 2.

Two lines (line RL and the line KL) are drawn at the boundary between the region I (of a certain store) and the region O (which is outside the store region I). In the region I, two lines (line BL and the line KL) are drawn at a position away from the boundary between the region I and the region O. In this example, the region I corresponds to the "first area" and the region O corresponds to the "second area".

In the pattern information 2581, line RL and line KL are registered as the limitation pattern and line BL and line KL are registered as the release pattern.

The nonvolatile memory 258 stores, as the setting information, information associating the detection order of line KL→line BL (line KL before line BL) and movement from the second area side of the release pattern to the first area side of the release pattern.

Based on the above premise, it is assumed that, when the load applied to the caster sections 203 is increasing, the user moves the shopping cart 1 from the region O side, which is the outside of the store region, to the region I side, which is the region in the store, and thus cross the line KL and the line BL.

At this time, the camera 2051 first images the line KL and then the line BL. Therefore, the detecting unit 2511 detects the line KL and, thereafter, detects the line BL. Therefore, the determining unit 2512 recognizes the line KL before the line BL (line KL→the line BL) as detection order of the release pattern.

The determining unit 2512 checks (refers to) the setting information stored in the nonvolatile memory 258 and determines whether the shopping cart 1 moved from the second area side of the release pattern to the first area side of the release pattern. The movement control unit 2513 releases the lock control for the caster sections 203 according to the determination result.

The release pattern is not limited to the example explained above. For example, line RL, which is closer to the first area among a plurality of lines forming the limitation pattern, may be the release pattern.

If caster sections 203 are simply unlocked whenever the determining unit 2512 determines that the shopping cart 1 has moved from the second area to the first area, it is likely that the locking and the unlocking of the caster sections 203 will be frequently performed. In this case, the cart user may become confused.

Therefore, by providing the release pattern at the position in the first area away from the boundary between the first area and the second area as in this modification, it is possible to prevent the lock and the unlock of the caster sections 203 from being frequently performed. That is, the shopping cart 1 according to this modification is capable of preventing a situation in which the cart user might become confused.

Others

A program to be executed by the controller 251 of the cart terminal 2 can be incorporated in advance in a storage medium (e.g., the ROM 253 or the nonvolatile memory 258) included in the cart terminal 2.

However, the program may also be recorded in a non-transitory computer-readable recording medium such as a CD-ROM, a flexible disk (FD), a CD-R, or a DVD (Digital Versatile Disk) in an installable format or an executable format.

The storage medium is not limited to a medium independent from a computer or an incorporating system and includes a storage medium in which the program is transmitted by a LAN, the Internet, or the like, downloaded and stored or temporarily stored.

The program to be executed by the controller 251 may be provided by being stored on a computer connected to a network such as the Internet and downloaded through the network. The program in an embodiment may be provided or distributed through the network such as the Internet.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping cart, comprising:
wheels;
an imaging unit configured to acquire images of a surface at a location of the shopping cart; and
a controller configured to:
detect a limitation pattern in images acquired by the imaging unit, the limitation pattern being on the surface at a boundary between a first area and a second area;
determine based on the detected limitation pattern whether the shopping cart has been moved from the first area to the second area or from the second area to the first area; and
control mobility of the shopping cart based on whether the shopping cart has been moved from the first area to the second area or from the second area to the first area, wherein
the mobility of the shopping cart is controlled by locking or unlocking of the wheels, and
the locking of the wheels can be performed in a stepwise manner such that mobility of the shopping cart is gradually reduced from a fully mobile state to an immobile state.

2. The shopping cart according to claim 1, further comprising:
a solenoid configured to lock and unlock one of the wheels under the control of the controller.

3. The shopping cart according to claim 1, wherein the controller locks the wheels if it is determined that the shopping cart moved from the first area to the second area.

4. The shopping cart according to claim 1, wherein the controller unlocks the wheels if it is determined that the shopping cart moved from the second area to the first area.

5. A shopping cart, comprising:
wheels;
an imaging unit configured to acquire images of a surface at a location of the shopping cart; and
a controller configured to:
detect a limitation pattern in images acquired by the imaging unit, the limitation pattern being on the surface at a boundary between a first area and a second area;
determine based on the detected limitation pattern whether the shopping cart has been moved from the first area to the second area or from the second area to the first area; and
control mobility of the shopping cart based on whether the shopping cart has been moved from the first area to the second area or from the second area to the first area, wherein
the mobility of the shopping cart is controlled by locking or unlocking of the wheels, and
the controller begins to lock the wheels in a stepwise manner if it is determined that the shopping cart moved from the first area to the second area and a predetermined time has elapsed without the shopping cart being determined to have moved from the second area to the first area.

6. The shopping cart according to claim 1, wherein the controller is further configured to:
detect a release pattern on the surface in the first area away from the boundary,
release any mobility reduction imposed on the shopping cart after the shopping cart was determined to have been moved from the first area to the second area when the release pattern is detected after the mobility reduction was imposed.

7. The shopping cart according to claim 1, further comprising:
a notification unit configured to urge a shopping cart user to return the shopping cart to the first area from the second area, wherein
the controller is configured to cause the notification unit to urge the shopping cart user to return the shopping cart to the first area from the second area after the shopping cart is determined to have been moved from the first area into the second area based on the detection of the limitation pattern.

8. The shopping cart according to claim 7, wherein the notification unit comprises a display screen mounted on the shopping cart.

9. The shopping cart according to claim 1, wherein the surface is a floor.

10. The shopping cart according to claim 1, wherein the surface is a ceiling.

11. The shopping cart according to claim 1, wherein the imaging unit is a camera facing the surface.

12. The shopping cart according to claim 1, wherein the limitation pattern is a pair of parallel lines, each line in the pair being distinguishable from the other by at least one of color or pattern.

13. A shopping cart with a cart-based point-of-sale terminal, the shopping cart comprising:
a plurality of wheels for moving on a floor surface;
a camera positioned to acquire images of the floor surface;
a mobility control device configured to lock and unlock the wheels to alter the mobility of the shopping cart on the floor surface; and
a controller including a memory unit and configured to:
detect a limitation pattern on the floor surface in the images of the floor surface acquired by the camera;
determine whether the shopping cart has moved from a first side of the limitation pattern to a second side of the limitation pattern or from the second side to the first side based on a pre-stored orientation for the limitation pattern in the memory unit;
control the mobility control device to begin to lock the wheels after the shopping cart has moved from the first side to second side of the limitation pattern; and control the mobility control device to unlock the wheels after the shopping cart has moved from the second side to the first side of the limitation pattern, wherein
the limitation pattern is a pair of parallel lines, each line in the pair being distinguishable from the other by at least one of color or pattern.

14. The shopping cart according to claim 13, wherein the mobility control device comprises a solenoid.

15. The shopping cart according to claim 13, further comprising:
a display screen, wherein
the controller is configured to cause the display screen to display a message urging the return of the shopping cart to the first side of the limitation pattern from the second side after the shopping cart has been moved from the first side of the limitation pattern to second side.

16. A shopping cart movement control system, comprising:
a limitation pattern drawn on a surface at a boundary between a first area and a second area, the limitation pattern comprising a pair of parallel lines, each line in the pair being distinguishable from the other by at least one of color or pattern;
a plurality of shopping carts intended for use in the first area but not in the second area, each shopping cart comprising:
an imaging unit configured to acquire images of the surface at a present location of the shopping cart;
a controller configured to:
detect the limitation pattern in images acquired by the imaging unit;
determine based on the detected limitation pattern whether the shopping cart has been moved from the first area to the second area or from the second area to the first area; and
control mobility of the shopping cart based on whether the shopping cart has been moved from the first area to the second area or from the second area to the first area.

17. The shopping cart movement control system according to claim 16, wherein the surface is a floor on which the plurality of shopping carts can move.

18. A shopping cart, comprising:
an imaging unit configured to acquire images of a surface at a location of the shopping cart; and
a controller configured to:
detect a limitation pattern in images acquired by the imaging unit, the limitation pattern being on the surface at a boundary between a first area and a second area;
determine based on the detected limitation pattern whether the shopping cart has been moved from the first area to the second area or from the second area to the first area; and
control mobility of the shopping cart based on whether the shopping cart has been moved from the first area to the second area or from the second area to the first area, wherein
the limitation pattern is a pair of parallel lines, each line in the pair being distinguishable from the other by at least one of color or pattern.

19. The shopping cart according to claim 18, wherein the controller is further configured to:
detect a release pattern on the surface in the first area away from the boundary,
release any mobility reduction imposed on the shopping cart after the shopping cart was determined to have been moved from the first area to the second area when the release pattern is detected after the mobility reduction was imposed.

20. The shopping cart according to claim 1, wherein the controller begins to lock the wheels in a stepwise manner if it is determined that the shopping cart moved from the first area to the second area and a predetermined time has elapsed without the shopping cart being determined to have moved from the second area to the first area.

* * * * *